United States Patent
Tsunoo et al.

(10) Patent No.: US 10,636,414 B2
(45) Date of Patent: Apr. 28, 2020

(54) SPEECH PROCESSING APPARATUS AND SPEECH PROCESSING METHOD WITH THREE RECOGNIZERS, OPERATION MODES AND THRESHOLDS

(71) Applicant: SONY CORPORATION, Tokyo (JP)

(72) Inventors: Emiru Tsunoo, Tokyo (JP); Toshiyuki Kumakura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 76 days.

(21) Appl. No.: 16/063,052

(22) PCT Filed: Nov. 28, 2016

(86) PCT No.: PCT/JP2016/085245
§ 371 (c)(1),
(2) Date: Jun. 15, 2018

(87) PCT Pub. No.: WO2017/154282
PCT Pub. Date: Sep. 14, 2017

(65) Prior Publication Data
US 2019/0027130 A1    Jan. 24, 2019

(30) Foreign Application Priority Data
Mar. 10, 2016    (JP) ................... 2016-046466

(51) Int. Cl.
*G10L 15/30*    (2013.01)
*G10L 15/32*    (2013.01)
(Continued)

(52) U.S. Cl.
CPC .......... *G10L 15/01* (2013.01); *G06F 17/2735* (2013.01); *G10L 15/08* (2013.01);
(Continued)

(58) Field of Classification Search
CPC ......... G10L 15/30; G10L 15/32; G10L 15/08; G06F 3/04842
(Continued)

(56) References Cited

U.S. PATENT DOCUMENTS 7,003,463 B1    2/2006 Maes et al.
7,657,433 B1 *  2/2010 Chang ................... G10L 15/08
                                                       704/236
(Continued)

OTHER PUBLICATIONS

Nov. 13, 2018, European Search Report issued for related EP application No. 16893606.0.

*Primary Examiner* — Farzad Kazeminezhad
(74) *Attorney, Agent, or Firm* — Paratus Law Group, PLLC

(57) ABSTRACT

There is provided a speech processing apparatus to improve the flexibility of processing regarding speech recognition, the speech processing apparatus including: a determination unit configured to determine how to deal with a recognition result of speech data obtained by a first speech recognizer on a basis of a comparison between a certainty factor of the recognition result of the speech data obtained by the first speech recognizer and a threshold; and a threshold setting unit configured to set dynamically the threshold. The method further comprises using three operation modes where third, second and first modes comprise of three, two and one recognizers respectively, and the threshold in the third mode is lower than the second mode and higher than the first mode.

14 Claims, 11 Drawing Sheets

(51) Int. Cl.
G10L 15/08 (2006.01)
G06F 3/0484 (2013.01)
G10L 15/01 (2013.01)
G06F 17/27 (2006.01)
G10L 15/22 (2006.01)

(52) U.S. Cl.
CPC .............. G10L 15/22 (2013.01); G10L 15/30 (2013.01); G10L 15/32 (2013.01); *G10L 2015/225* (2013.01)

(58) Field of Classification Search
USPC ................................ 704/270, 231, 236, 275
See application file for complete search history.

(56) References Cited

U.S. PATENT DOCUMENTS

| | | | |
|---|---|---|---|
| 8,924,219 B1* | 12/2014 | Bringert | G06F 3/04842 704/275 |
| 2006/0009980 A1* | 1/2006 | Burke | G10L 15/30 704/270 |
| 2011/0161077 A1* | 6/2011 | Bielby | G10L 15/32 704/231 |
| 2012/0179457 A1 | 7/2012 | Newman et al. | |
| 2012/0179469 A1* | 7/2012 | Newman | G10L 15/30 704/270 |
| 2015/0120296 A1 | 4/2015 | Stern et al. | |
| 2015/0287413 A1* | 10/2015 | Jung | G10L 15/32 704/231 |

\* cited by examiner

SPEECH PROCESSING APPARATUS AND SPEECH PROCESSING METHOD WITH THREE RECOGNIZERS, OPERATION MODES AND THRESHOLDS

CROSS REFERENCE TO PRIOR APPLICATION

This application is a National Stage Patent Application of PCT International Patent Application No. PCT/JP2016/085245 (filed on Nov. 28, 2016) under 35 U.S.C. § 371, which claims priority to Japanese Patent Application No. 2016-046466 (filed on Mar. 10, 2016), which are all hereby incorporated by reference in their entirety.

TECHNICAL FIELD

The present disclosure relates to a speech processing apparatus and a speech processing method.

BACKGROUND ART

A speech processing apparatus for mechanically recognizing speech uttered by a user is actively studied nowadays. The user's speech may be recognized in a local terminal or by a server over a network. In one example. Patent Literature 1 discloses a technique for recognizing the user's speech by both a terminal device and a server and for selectively employing a result of the recognition performed by the terminal device or a result of the recognition performed by the server.

CITATION LIST

Patent Literature

Patent Literature 1: JP 2013-064777A

DISCLOSURE OF INVENTION

Technical Problem

For the speech recognition described above, a method of determining whether to use a speech recognition result on the basis of a comparison between the certainty factor of the speech recognition result and the fixed threshold can be considered. It is however assumed that a situation regarding speech recognition, such as the surrounding environment of the user or the availability of an external device, varies. Thus, it is desirable to improve the flexibility of processing regarding speech recognition.

Solution to Problem

According to the present disclosure, there is provided a speech processing apparatus including: a determination unit configured to determine how to deal with a recognition result of speech data obtained by a first speech recognizer on a basis of a comparison between a certainty factor of the recognition result of the speech data obtained by the first speech recognizer and a threshold; and a threshold setting unit configured to set dynamically the threshold.

In addition, according to the present disclosure, there is provided a speech processing method including: determining how to deal with a recognition result of speech data on a basis of a comparison between a certainty factor of the recognition result of the speech data and a threshold; and setting, by a processor, dynamically the threshold.

Advantageous Effects of Invention

According to the present disclosure as described above, it is possible to improve the flexibility of processing regarding speech recognition.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
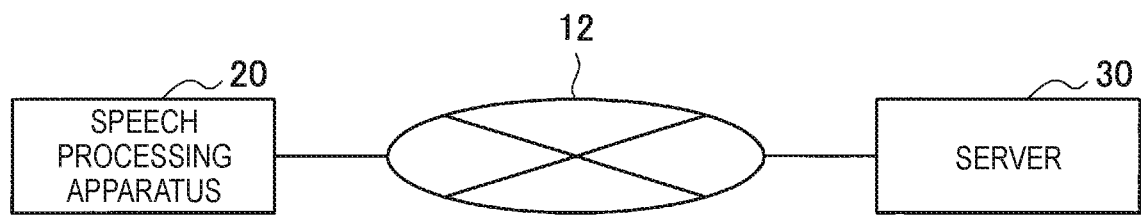
FIG. 1 is a diagram illustrated to describe a speech processing system according to a first embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that, in this description and the drawings, structural elements that have substantially the same function and structure are sometimes distinguished from each other using different alphabets after the same reference sign. However, when there is no need in particular to distinguish structural elements that have substantially the same function and structure, the same reference sign alone is attached.

Further, the present disclosure will be described in the order of items shown below.
1. First Embodiment
1-1. Overview of speech processing system
1-2. Configuration
1-3. Operation
1-4. Modification
2. Second Embodiment
2-1. Configuration
2-2. Operation
3. Hardware configuration
4. Concluding remarks
<<1. First Embodiment>>

A first embodiment of the present disclosure is now described. The first embodiment of the present disclosure relates to a speech processing system for mechanically recognizing speech uttered by a user. The speech processing system can perform various types of processing on the basis of a result obtained by recognizing the speech uttered by the user. An overview of the speech processing system according to the first embodiment of the present disclosure is described below with reference to FIG. 1.

<1-1. Overview of Speech Processing System>

FIG. 1 is a diagram illustrated to describe the speech processing system according to the first embodiment of the present disclosure. As illustrated in FIG. 1, the speech processing system according to the first embodiment has a speech processing apparatus 20 and a server 30. The speech processing apparatus 20 and the server 30 are connected to each other via a communication network 12.

The communication network 12 is a wired or wireless transmission channel of information transmitted from a device connected to the communication network 12. In one example, the communication network 12 may include a public line network such as the Internet, telephone networks, and satellite communication networks, or various local area networks (LANs) and wide area networks (WANs) including Ethernet (registered trademark). In addition, the communication network 12 may include a leased line network such as Internet protocol-virtual private network (IP-VPN).

The speech processing apparatus 20 converts speech uttered by a user into speech data that is an electrical signal, recognizes the speech data, and executes processing corresponding to a recognition result of the speech data. In one example, in a case where the speech processing apparatus 20 has a content playback function, the speech processing apparatus 20 may start the playback of music on the basis of recognition of speech data of "Play music". In this way, the user is capable of operating the speech processing apparatus 20 by speech, so the intuitive operation and hands-free operation are achieved. In one example, the user can perform an operation while jogging or sports, or perform an operation while driving a car.

Further, the speech processing apparatus 20 according to the present embodiment is capable of cooperating with the server 30 for speech recognition. In one example, the speech processing apparatus 20 is capable of transmitting the speech data to the server 30 via the communication network 12 and receiving the recognition result of the speech data from the server 30. In the following description, an operation mode in which the speech recognition is performed in both the speech processing apparatus 20 and the server 30 is referred to as a hybrid mode, and an operation mode in which the speech recognition is performed in the speech processing apparatus 20 but not performed in the server 30 is referred to as a local mode.

Moreover, the speech processing apparatus 20 can be implemented in various forms. In one example, the speech processing apparatus 20 may be a mobile phone, a smartphone, a personal computer (PC), a game console, a video playback device, or a wearable device. Examples of the wearable device include a wristwatch-type device, an earphone-type device, a headphone-type device, a head-mounted display, a necklace-type device, and the like.

The server 30 recognizes the speech data received from the speech processing apparatus 20 and transmits the recognition result to the speech processing apparatus 20. The recognition result of the speech data transmitted from the server 30 may be information based on the speech recognition, such as text indicating contents of the speech or a command directed to the speech processing apparatus 20. In one example, in a case where the speech data of "Play music of artist A" is recognized by the server 30, the recognition result of the speech data may be the text of "Play music of artist A", or may be a command instructing the speech processing apparatus 20 to play back the music of the artist A.

(Overview of Speech Recognition)

An overview of the speech recognition performed by the speech processing apparatus 20 is now described. The speech processing apparatus 20 estimates a word string of the utterance contents from the signal waveform of the speech data. The estimation of the word string is formulated using an acoustic model and a language model as shown in Formula 1 below. Moreover, in Formula 1, X is a sequence of acoustic feature quantities and l is a word sequence. The word sequence l includes vocabularies in dictionary data used in the speech recognition. The more vocabulary in the dictionary data, the more it is possible to formally recognize more speech sounds, but the amount to be processed for search operations increases.

[Math 1]

$$\hat{l} = \mathrm{argmax}_l P(l/X) \qquad \text{(Formula 1)}$$
$$= \mathrm{argmax}_l P\frac{P(X/l)P(l)}{P(X)}$$
$$X = \{x_1, x_2, \ldots x_i, \ldots\} \quad l = \{l_1, l_2, \ldots\}$$

In the above, Formula 1 indicates that some recognition results are output by combining vocabularies in the dictionary data even in a case where utterance of out-of-vocabulary (OOV) of the dictionary data is performed. An example of a method of detecting whether the uttered speech is the out-of-vocabulary speech includes a method of preparing a garbage model P (loov) in parallel with a model P (l) for speech recognition (e.g., refer to "*A Comparison and Combination of Methods for OOV Word Detection and Word Confidence Scoring*" by Hazen and I. Bazzi, Proc. of ICASSP, pp. 397-400, 2001).

As the garbage model, in one example, a model representing a phoneme transition with n-gram probability is used. This model is expressed as Formula 2 below. In Formula 2, the phoneme sequence is expressed as loov $\{p_1, p_2, \ldots p_N\}$.

[Math 2]

$$P(l_{oov}) \approx \prod_{i=1}^{N} P(p_i \mid p_{i-n+1}, \ldots, p_{i-1})$$ (Formula 2)

Figure 2:
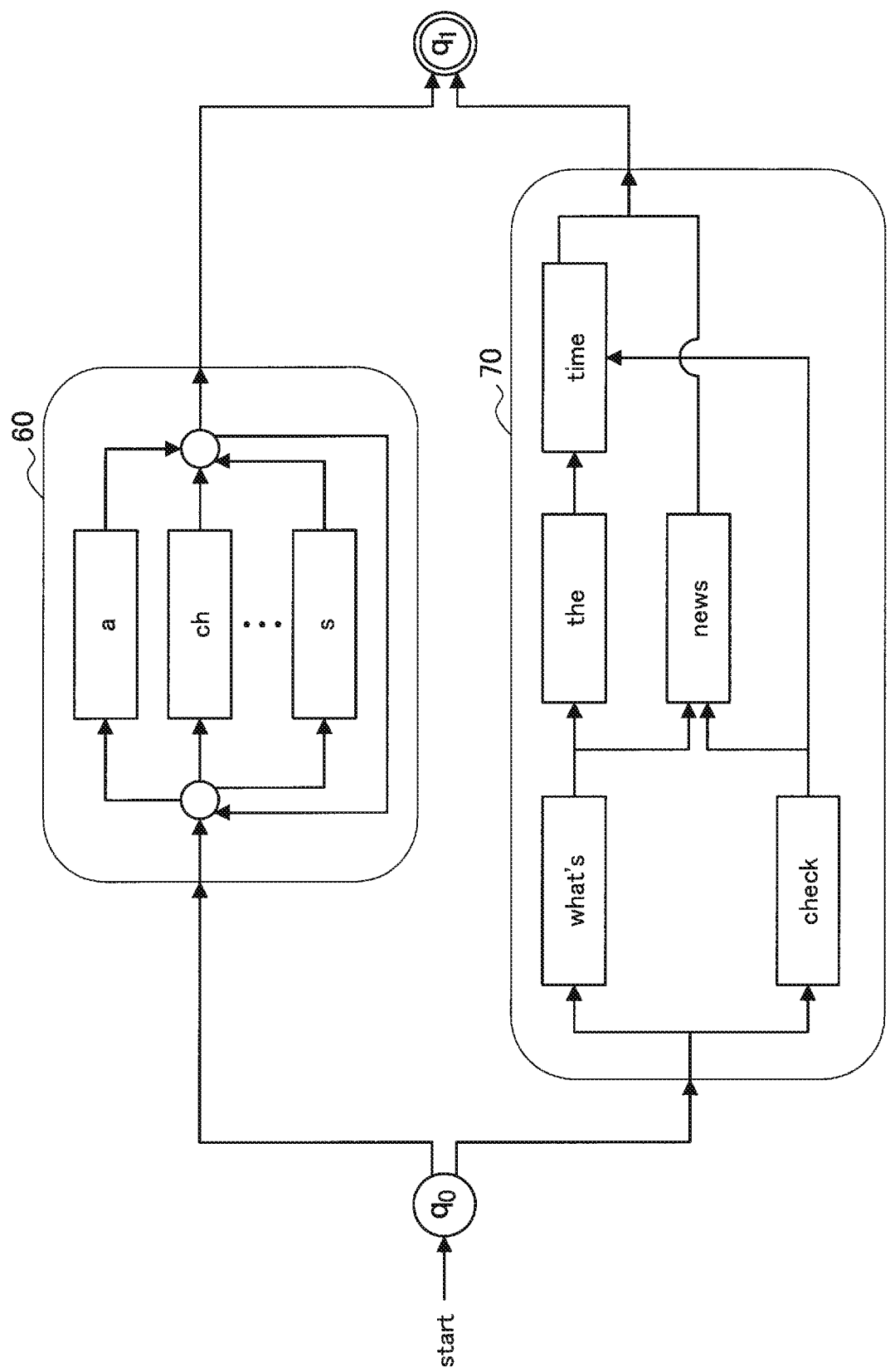
FIG. 2 is a diagram illustrated to describe calculation of a certainty factor.

The speech processing apparatus 20 can obtain a phoneme sequence that maximizes the probability shown in Formula 2 by Formula 3 below and can use the log likelihood difference expressed by Formula 4 as the certainty factor of the recognition result obtained by Formula 1. Moreover, this processing is expressed as illustrated in FIG. 2. In other words, the garbage model P (loov) 60 and the model P (l) 70 for speech recognition are used in parallel to obtain the certainty factor.

[Math 3]

$$\hat{l}_{oov} = \underset{l_{oov}}{\operatorname{argmax}} P(l_{oov} \mid X)$$ (Formula 3)

[Math 4]

$$\log(P(\hat{l} \mid X)) - \log(P(\hat{l}_{oov} \mid X))$$ (Formula 4)

Figure 3:
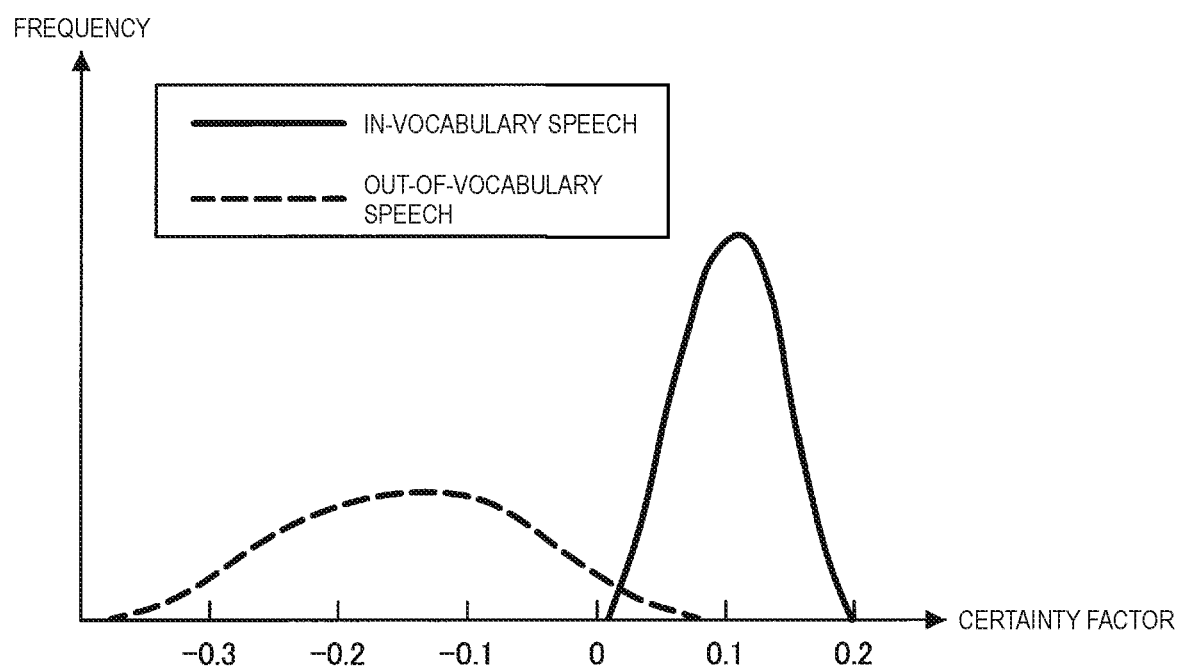
FIG. 3 is a diagram illustrated to describe a relationship between log likelihood differences of out-of-vocabulary speech and in-vocabulary speech.

The certainty factor obtained for the out-of-vocabulary speech tends to be lower than the certainty factor obtained for the in-vocabulary speech. In one example, as illustrated in FIG. 3, the certainty factor obtained for the out-of-vocabulary speech tends to be distributed mainly within the range of 0 to 0.2, and the out-of-vocabulary speech tends to be distributed mainly within the range of −0.3 to 0. Thus, the speech processing apparatus 20 is capable of determining whether the uttered speech is the in-vocabulary speech on the basis of whether the certainty factor exceeds a threshold.

(Background)

The speech processing apparatus 20 is capable of performing the processing using the recognition result of the in-vocabulary speech and rejecting the recognition result of the out-of-vocabulary speech. Additionally, in the hybrid mode, it is assumed that the out-of-vocabulary speech is used for the dictionary data of the speech processing apparatus 20 and the in-vocabulary speech is used for the dictionary data of the server 30. Thus, the speech processing apparatus 20 is capable of using the recognition result received from the server 30 while rejecting the recognition result of the out-of-vocabulary speech for the dictionary data of the speech processing apparatus 20.

Here, there is a range in which the certainty factors overlap between the in-vocabulary speech and the out-of-vocabulary speech. In the example illustrated in FIG. 3, the certainty factors of the in-vocabulary speech and the out-of-vocabulary speech are distributed within the range of approximately 0.01 to 0.07. Thus, if the threshold is set to 0.07, it is possible to prevent erroneous recognition that the out-of-vocabulary speech is the in-vocabulary speech, but the recognition result of the in-vocabulary speech is likely to be rejected in practice. On the other hand, if the threshold is set to 0.01, it is possible to prevent the recognition result of the in-vocabulary speech from being rejected, but a case where there is erroneous recognition that the out-of-vocabulary speech is the in-vocabulary speech is likely to occur in practice.

In view of the above, it is desirable that the threshold is set to an appropriate value within the overlapping range described above. However, if a fixed threshold is used in the case of using a plurality of operation modes as described above, a suitable result may be difficult to be obtained for each operation mode disadvantageously. In one example, if the same value is set to the threshold for both the local mode and the hybrid mode, the server 30 is unlikely to use fully the highly accurate recognition result, which disadvantageously leads to ineffective utilization of the server 30.

Thus, the present inventors have devised the speech processing apparatus 20 according to the first embodiment with the above-described circumstances as one point of view. It is possible for the speech processing apparatus 20 according to the first embodiment to implement both the proper processing in the local mode and the proper processing in the hybrid mode. The configuration and operation of the speech processing apparatus 20 according to the first embodiment of the present disclosure as described above are now described sequentially in detail.

<1-2. Configuration>

Figure 4:
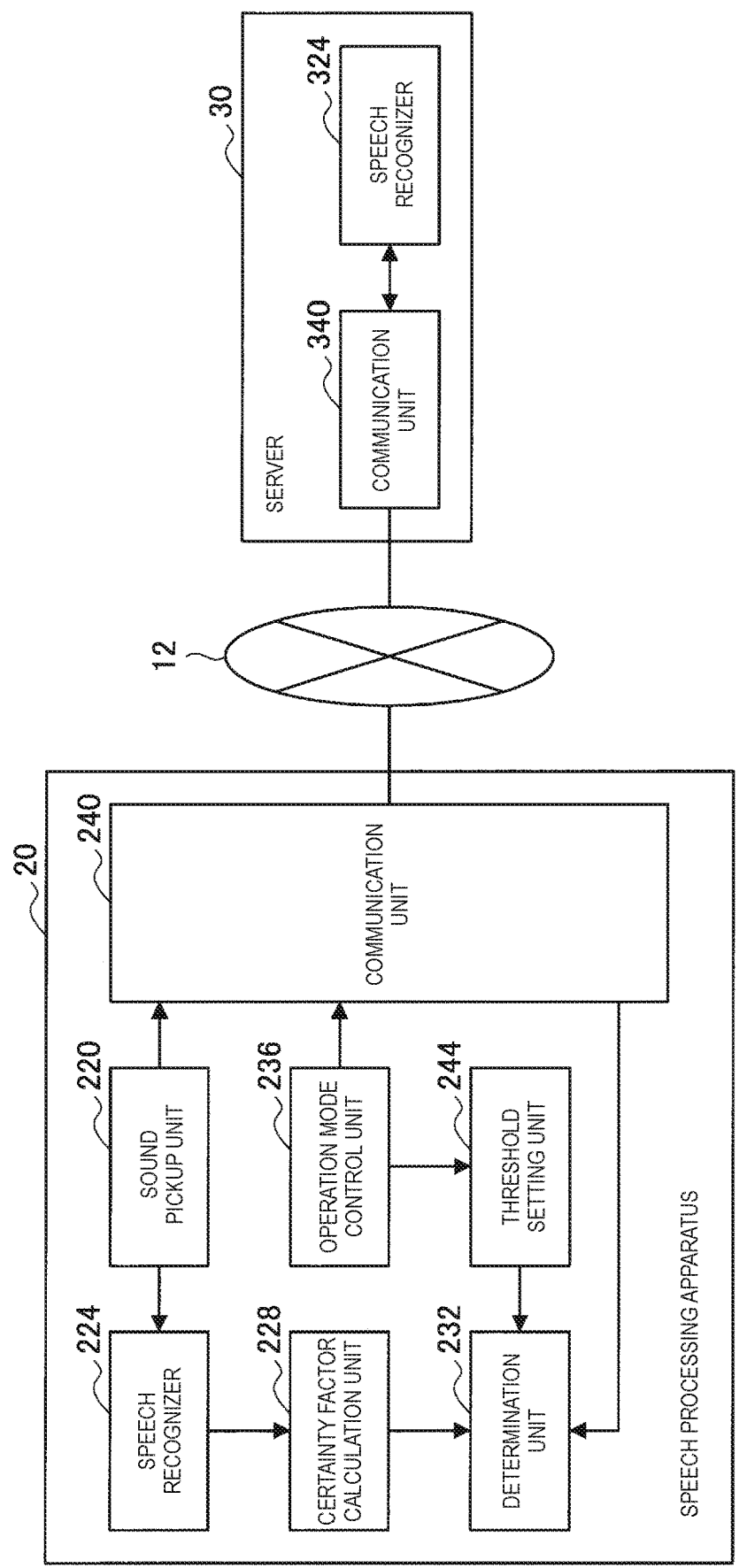
FIG. 4 is a functional block diagram illustrating a configuration of a speech processing apparatus and a server according to the first embodiment of the present disclosure.

FIG. 4 is a functional block diagram illustrating the configuration of the speech processing apparatus 20 and the server 30 according to the first embodiment of the present disclosure.

(Server)

As illustrated in FIG. 4, the server 30 includes a speech recognizer 324 and a communication unit 340. The communication unit 340 is an interface with the speech processing apparatus 20, so it receives speech data from the speech processing apparatus 20 and transmits the recognition result of the speech data obtained by the speech recognizer 324 to the speech processing apparatus 20.

The speech recognizer 324 is an example of a second speech recognizer and recognizes the speech data, which is received from the speech processing apparatus 20 through the communication unit 340, in one example, by means of the method described in the above item "Overview of speech recognition". The dictionary data used by the speech recognizer 324 includes more vocabulary data than that of the dictionary data used by a speech recognizer 224 of the speech processing apparatus 20, which will be described later. Thus, the speech recognition by the speech recognizer 324 is superior in recognition accuracy. The recognition result obtained by the speech recognizer 324 of the server 30 is referred to as a server recognition result, hereinafter.

(Speech Processing Apparatus)

The speech processing apparatus 20 includes a sound pickup unit 220, a speech recognizer 224, a certainty factor calculation unit 228, a determination unit 232, an operation mode control unit 236, a communication unit 240, and a threshold setting unit 244, as illustrated in FIG. 4.

The sound pickup unit 220 converts speech represented by aerial vibration into an electrical signal. The sound pickup unit 220 implements its function through, in one example, a microphone. An electrical signal (pulse code modulation: PCM) obtained by the sound pickup unit 220 is referred herein to as speech data.

The speech recognizer 224 is an example of the first speech recognizer, and recognizes the speech data input from the sound pickup unit 220 using the dictionary data, in one example, by means of the method described in the above item "Overview of speech recognition". The data amount of the dictionary data used by the speech recognizer 224 is smaller than that of the dictionary data used by the server 30, and the communication via the communication network 12 is not essential for the speech recognition by the speech recognizer 224. Thus, the speech recognition by the speech recognizer 224 is superior in terms of response speed.

The certainty factor calculation unit 228 calculates a certainty factor of the recognition result of the speech data obtained by the speech recognizer 224 (hereinafter referred to as a local recognition result). In one example, the certainty factor calculation unit 228 may calculate the certainty factor by operating the log likelihood difference shown in Formula 4.

The determination unit 232 determines how to deal with the local recognition result on the basis of the comparison between the certainty factor calculated by the certainty factor calculation unit 228 and the threshold set by the threshold setting unit 244. In one example, in a case where the certainty factor calculated by the certainty factor calculation unit 228 exceeds the threshold, the determination unit 232 determines to use the local recognition result. On the other hand, in a case where the certainty factor calculated by the certainty factor calculation unit 228 is equal to or less than the threshold, the determination unit 232 rejects the local recognition result. In the hybrid mode, in a case where the local recognition result is rejected, the determination unit 232 determines to use the server recognition result.

The operation mode control unit 236 controls the operation mode related to the speech recognition of the speech processing apparatus 20 between the local mode (the first operation mode) and the hybrid mode (the second operation mode). In one example, in a case where the communication unit 240 is connected to the server 30, the operation mode control unit 236 may set the operation mode to the hybrid mode. In a case where the communication unit 240 is not connected to the server 30, the operation mode control unit 236 may set the operation mode to the local mode. In addition, in a case where the remaining battery level of the speech processing apparatus 20 exceeds a predetermined value, the operation mode control unit 236 may set the operation mode to the hybrid mode. In a case where the remaining battery level is equal to or less than the predetermined value, the operation mode control unit 236 may set the operation mode to the local mode. In addition, the operation mode control unit 236 may control the operation mode in accordance with the user's operation.

The communication unit 240 is an interface with the server 30. In the hybrid mode, the communication unit 240 transmits the speech data that is input from the sound pickup unit 220 to the server 30 and receives the server recognition result from the server 30.

The threshold setting unit 244 dynamically sets a threshold used when the determination unit 232 determines how to deal with the local recognition result. In one example, the threshold setting unit 244 sets a threshold depending on whether the operation mode is the local mode or the hybrid mode. A specific example of the threshold to be set by the threshold setting unit 244 is now described with reference to FIG. 5.

Figure 5:
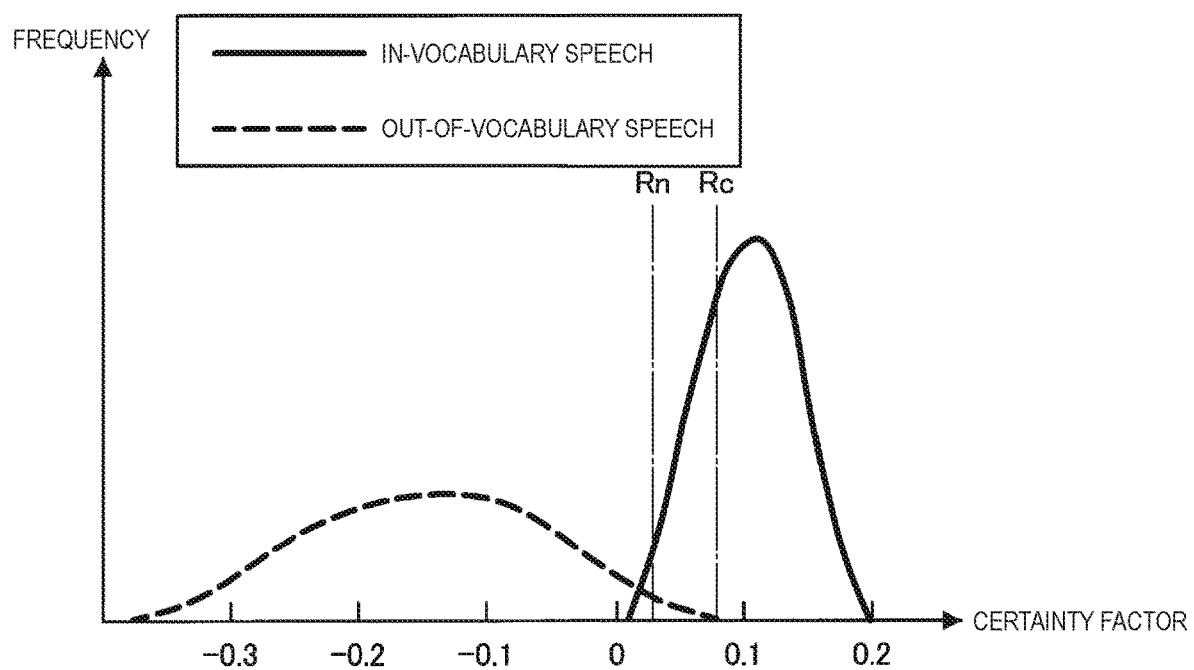
FIG. 5 is a diagram illustrated to describe a specific example of a threshold that is set by a threshold setting unit.

FIG. 5 is a diagram illustrated to describe a specific example of the threshold set by the threshold setting unit 244. The threshold setting unit 244 sets the threshold in the hybrid mode to a value higher than the threshold in the local mode. In one example, as illustrated in FIG. 5, a threshold Rc in the hybrid mode is set to a value higher than a threshold Rn in the local mode. Such a configuration makes it easier to reject the local recognition result in the hybrid mode than in the local mode, thereby achieving effective utilization of the server recognition result.

Here, the threshold Rn in the local mode may be set to a value in such a way to minimize the sum of an error rate at which the out-of-vocabulary speech is recognized erroneously as the in-vocabulary speech and an error rate at which the in-vocabulary speech is recognized erroneously as the out-of-vocabulary speech. In setting such a threshold Rn, in a case where the user utters a speech "lap time" during jogging, "what's the time" included in the dictionary data used by the speech recognizer 224 is obtained as the local recognition result. In this event, the word "time" overlaps between them, so the certainty factor of "what's the time" is likely to exceed the threshold Rn. In this case, the current time will be output corresponding to "what's the time" in the local mode. On the other hand, the threshold Rc higher than the threshold Rn is set in the hybrid mode, so the certainty factor of "what's the time" falls below the threshold Rc. In this case, it is expected that the local recognition result "what's the time" is rejected and the server recognition result is determined to be used. In other words, the setting of the threshold Rc in the hybrid mode to a value higher than the threshold Rn in the local mode makes it possible to actively use the server recognition result in the hybrid mode. Moreover, although the use of the server recognition result involves a communication delay, if the certainty factor of the local recognition result exceeds the threshold Rc, the determination unit 232 determines to use the local recognition result, thereby achieving a quicker response.

<1-3. Operation>

The configuration of the speech processing apparatus 20 and the server 30 according to the first embodiment is described above. Subsequently, the operation of the speech processing apparatus 20 according to the first embodiment is described sequentially with reference to FIG. 6.

Figure 6:
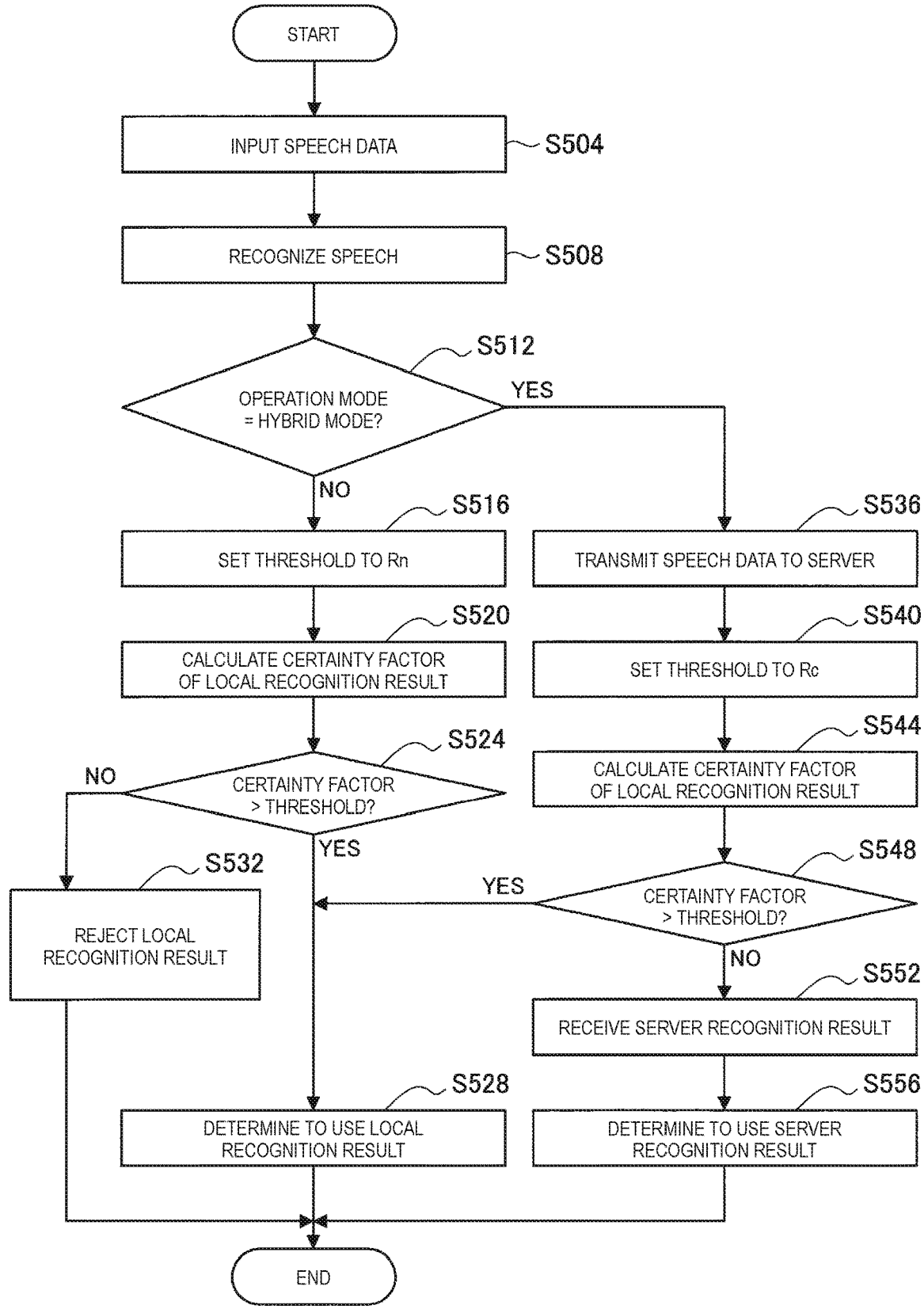
FIG. 6 is a flowchart illustrating the operation of the speech processing apparatus according to the first embodiment.

FIG. 6 is a flowchart illustrating the operation of the speech processing apparatus 20 according to the first embodiment. As illustrated in FIG. 6, first, if the speech data is input from the sound pickup unit 220 to the speech recognizer 224 (S504), the speech recognizer 224 recognizes the speech data (S508).

Then, if the operation mode is the local mode (No in S512), the threshold setting unit 244 sets a threshold to Rn (S516). In addition, the certainty factor calculation unit 228 calculates a certainty factor of the local recognition result (S520). If the certainty factor of the local recognition result exceeds the threshold Rn, the determination unit 232 determines to use the local recognition result (Yes in S524 and then S528). If the certainty factor of the local recognition result is equal to or less than the threshold Rn, the determination unit 232 rejects the local recognition result and outputs a signal indicating that the speech data recognition is failed (No in S524 and then S532).

On the other hand, if the operation mode is the hybrid mode (Yes in S512), the communication unit 240 transmits the speech data to the server 30 (S536), and the threshold setting unit 244 sets the threshold to Rc (S540). In addition, the certainty factor calculation unit 228 calculates a certainty factor of the local recognition result (S544). If the certainty factor of the local recognition result exceeds the threshold Rc, the determination unit 232 determines to use the local recognition result (Yes in S548 and then S528). On the other hand, if the certainty factor of the local recognition result is equal to or less than the threshold Rc, the server recognition result is received by the communication unit 240 (S552), and the determination unit 232 determines to use the server recognition result (S556).

The above description is given of the example of the operation in which the speech data is transmitted to the server 30 before the determination of whether to use the local recognition result. According to the operation example, it is possible to shorten the time from input of the speech data to reception of the server recognition result. However, the speech processing apparatus 20 can transmit the speech data to the server 30 after the rejection of the local recognition result. Such a configuration makes it possible to reduce the traffic of communication between the speech processing apparatus 20 and the server 30, thereby reducing the processing load imposed on them.

<1-4. Modification>

The first embodiment of the present disclosure is described above. Several modifications of the first embodiment of the present disclosure are described below. Moreover, the modifications described below are individually applicable to the first embodiment or are applicable to the first embodiment in combination. In addition, each of the modifications is applicable instead of the configuration described in the first embodiment or is additionally applicable to the configuration described in the first embodiment.

(First Modification)

The above description is given of the example in which the threshold Rc is set in the hybrid mode, but in the hybrid mode, the threshold can also be dynamically set. In one example, the threshold setting unit 244 can set the threshold in the hybrid mode on the basis of the setting that is preset by the manufacturer during manufacturing or the setting specified by the user the initially, inclusively, or each time speech recognition is performed. The first modification is described now in detail with reference to FIG. 7.

Figure 7:
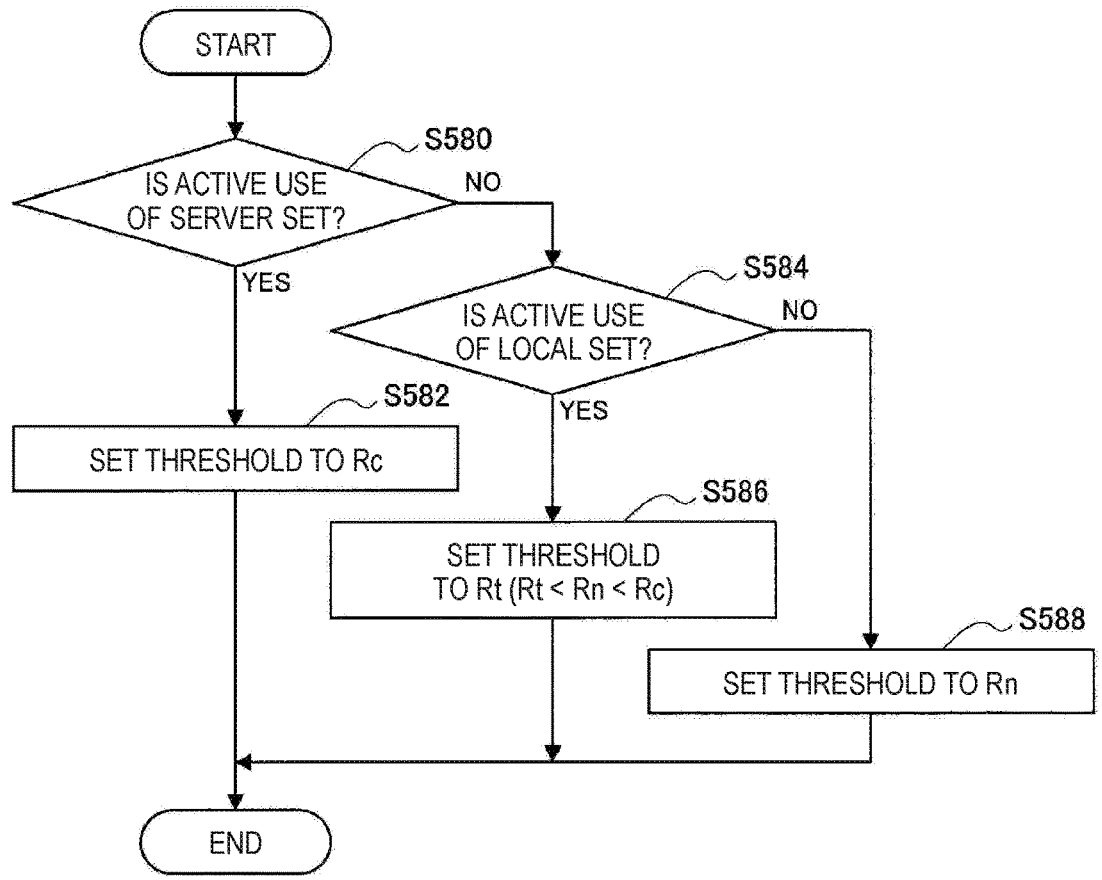
FIG. 7 is a flowchart illustrating a method of setting a threshold in a hybrid mode according to a first modification.

FIG. 7 is a flowchart illustrating a method of setting a threshold in the hybrid mode according to the first modification. As illustrated in FIG. 7, if the setting to actively use the server 30 is employed (Yes in S580), the threshold setting unit 244 sets, as the threshold, Rc that is higher than the threshold Rn in the local mode (S582).

On the other hand, if the setting to actively use local is employed (Yes in S584), the threshold setting unit 244 sets, as the threshold, Rt that is lower than the threshold Rn in the local mode (S586). If neither the setting to actively use the server 30 nor actively use the local is employed (No in S584), the threshold setting unit 244 sets, as the threshold, Rn that is similar to that in the local mode (S588).

Moreover, in a case where the certainty factor is an average value of frames of the log likelihood difference expressed by, in one example. Formula 4, Rn may be a value within a range of 0.02 to 0.06, and Rc may be a value within a range of 0.09 to 0.11 (particularly, 0.1), and Rt may be a value within a range of −0.01 to 0.02 (particularly, 0.0). If Rn is within the range of 0.02 to 0.06, it is possible to achieve the minimization of the sum of the error rate at which the out-of-vocabulary speech of the speech processing apparatus 20 is erroneously recognized as the in-vocabulary speech and the error rate at which the in-vocabulary speech is erroneously recognized as the out-of-vocabulary speech. If Rc that is a value within the range of 0.09 to 0.11 is set to the threshold in the hybrid mode, the local recognition result is likely to be easily rejected, so the server recognition result is more likely to be used. Such setting of Rc makes it possible to improve the recognition accuracy. In addition, if Rt that is a value within the range of −0.01 to 0.02, is set to the threshold in the hybrid mode, the local recognition result is likely to be easily used, so the server recognition result is difficult to use. Such setting of Rt makes it possible to achieve the improvement in responsiveness.

(Second Modification)

Further, the threshold setting unit 244 can set the threshold in the hybrid mode depending on the situation of communication between the speech processing apparatus 20 and the server 30. In one example, the worse the situation of communication between the speech processing apparatus 20 and the server 30, the more the timing at which the server recognition result can be obtained from the server 30 may be delayed. Thus, in the case where the local recognition result is rejected, the delay until response is made also increases. Thus, from the viewpoint of the response speed, it is desirable that the local recognition result be actively employed in a case where the situation of communication between the speech processing apparatus 20 and the server 30 falls below a predetermined reference value. The operation according to the second modification regarding the concept described above is now described with reference to FIG. 8.

Figure 8:
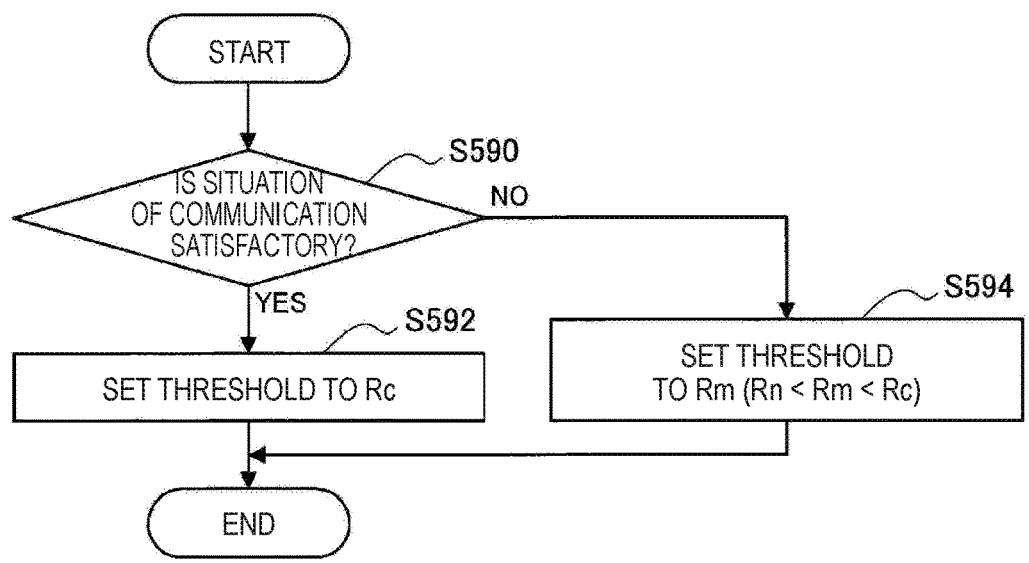
FIG. 8 is a flowchart illustrating a method of setting a threshold in a hybrid mode according to a second modification.

FIG. 8 is a flowchart illustrating a method of setting a threshold in the hybrid mode according to the second modification. As illustrated in FIG. 8, if the situation of communication is satisfactory (Yes in S590), the threshold setting unit 244 sets, as the threshold, Rc that is higher than the threshold Rn in the local mode (S592). On the other hand, if the situation of communication is unsatisfactory (No in S590), the threshold setting unit 244 sets, as the threshold, Rm that satisfies a condition of Rn<Rm<Rc (S594).

Moreover, whether the situation of communication is satisfactory can be determined depending on whether the condition such as the communication error rate and the communication delay time or the like exceeds the predetermined reference value as described above. Further, the above description is given of the example in which Rm exceeds Rn, but Rm can be less than Rn. Such a configuration makes it easier to use the local recognition result, thereby achieving further improvement in responsiveness.

(Third Modification)

A third modification is now described. In the first modification and the second modification, the description is given of the dynamic setting of the threshold in the hybrid mode. The third modification relates to a configuration for dynamically setting a threshold also in the local mode.

The certainty factor calculated by the certainty factor calculation unit 228 can vary depending on the noise component included in the speech data even in a case where the user similarly utters speech having the same contents. Thus, the threshold setting unit 244 can set the threshold depending on the noise component included in the speech data also in the local mode.

In one example, in a case where the noise component is relatively high, it is considered that the histogram illustrated in FIG. 5 shifts to the lower value side as a whole. Thus, the threshold setting unit 244 may set the threshold in the local mode to a lower value as the noise component included in the speech data is larger. Such a configuration makes it possible to achieve appropriate processing depending on the surrounding environment of the speech processing apparatus 20. Moreover, the noise component can be detected, in one example, by using the wavelet transform, but a method of detecting the noise component is not limited to a particular method.

Further, the above description is given of the method of setting the threshold depending on the noise component as the method of dynamically setting the threshold in the local mode, but such a dynamic setting method is not limited to this example. In one example, in a case where the time length of the speech uttered by the user is longer than the longest text corresponding to the speech recognizable by the speech processing apparatus 20, the speech uttered by the user is highly likely to be the out-of-vocabulary speech. Thus, the local recognition result is highly likely to be erroneous, so the threshold setting unit 244 may set the threshold to a higher value than other cases so that the local recognition result is rejected in the above case.

Further, the threshold setting unit 244 can apply the third modification to the hybrid mode in a similar way. In addition, in the case where the threshold is published as an API version and is programmable, an external application program (not shown) using the API may dynamically set the threshold in the threshold setting unit 244 at the time of execution. Furthermore, in this case, the threshold that becomes programmable as an API may be abstracted, and it is applicable to either the hybrid mode or the local mode.

<<2. Second Embodiment>>

The first embodiment of the present disclosure is described above. Subsequently, a second embodiment of the present disclosure is now described. The second embodiment of the present disclosure relates to a system in which more number of devices performs the speech recognition.

<2-1. Configuration>

Figure 9:
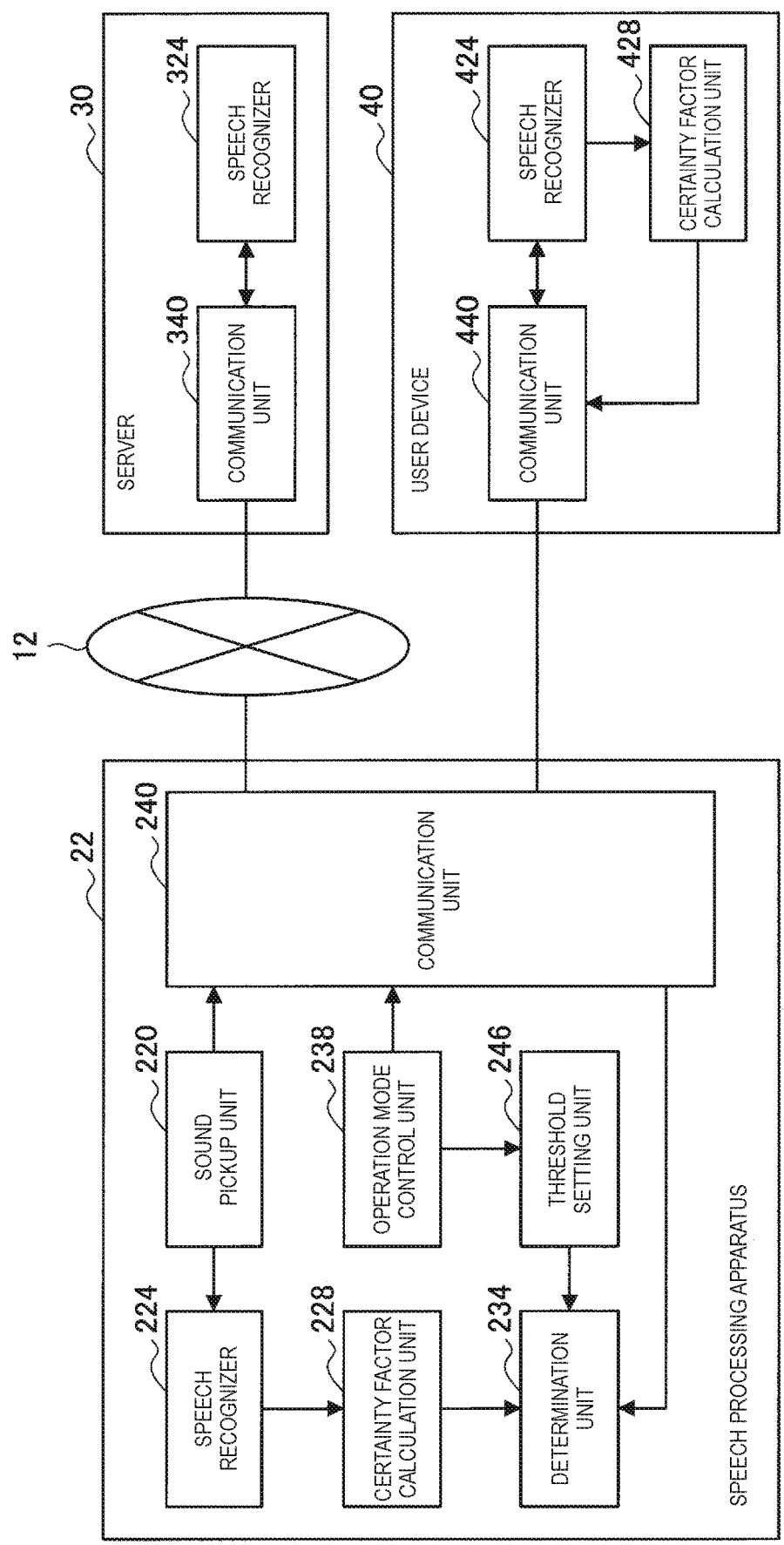
FIG. 9 is a diagram illustrated to describe a configuration of a speech processing system according to a second embodiment.

FIG. 9 is a diagram illustrated to describe a configuration of a speech processing system according to the second embodiment. As illustrated in FIG. 9, the speech processing system according to the second embodiment includes a speech processing apparatus 22, a server 30, and a user device 40.

In the second embodiment, it is assumed that a wearable device such as a wristwatch-type device, an earphone-type device, a headphone-type device, a head-mounted display, and a necklace-type device is used as the speech processing apparatus 22, and it is assumed that an information processing device such as a smartphone that communicates with the speech processing apparatus 22 through a short-range wireless communication scheme (e.g., wireless LAN) is used as the user device 40. The configuration of the server 30 is similar to that described in the first embodiment, so a detailed description of the server 30 will be omitted here.

(User Device)

As illustrated in FIG. 9, the user device 40 includes a speech recognizer 424, a certainty factor calculation unit 428, and a communication unit 440. The communication unit 440 is an interface with the speech processing apparatus 22, so it receives speech data from the speech processing apparatus 22, and transmits the recognition result of the speech data by the speech recognizer 424 and the certainty factor calculated by the certainty factor calculation unit 428 to the speech processing apparatus 22.

The speech recognizer 424 is an example of a third speech recognizer and recognizes the speech data received from the speech processing apparatus 22 through the communication unit 440 using the dictionary data, in one example, by means of the method described in the above item "Overview of speech recognition". The vocabulary included in the dictionary data used by the speech recognizer 424 is larger than that of the dictionary data used by the speech recognizer 224 of the speech processing apparatus 22 and is smaller than that of the dictionary data used by the speech recognizer 324 of the server 30.

The certainty factor calculation unit 428 calculates a certainty factor of the recognition result of the speech data obtained by the speech recognizer 424. In one example, the certainty factor calculation unit 428 can calculate the certainty factor by operating the log likelihood difference shown in Formula 4.

Moreover, it is assumed that, as the user device 40, an information processing device that communicates with the speech processing apparatus 22 through the short-range wireless communication scheme as described above is used. On the other hand, the communication between the speech processing apparatus 22 and the server 30 is performed via the communication network 12. Thus, it is expected that the responsiveness of speech recognition viewed from the speech processing apparatus 22 is higher in the user device 40 than in the server 30.

(Speech Processing Apparatus)

The speech processing apparatus 22 includes a sound pickup unit 220, a speech recognizer 224, a certainty factor calculation unit 228, a determination unit 234, an operation mode control unit 238, a communication unit 240, and a threshold setting unit 246, as illustrated in FIG. 9. The sound pickup unit 220, the speech recognizer 224, and the certainty factor calculation unit 228 are the same in configuration as those described in the first embodiment, so a detained description of the sound pickup unit 220, the speech recognizer 224, and the certainty factor calculation unit 228 will be omitted here.

The determination unit 234 determines how to deal with the local recognition result on the basis of the comparison between the certainty factor calculated by the certainty factor calculation unit 228 and the threshold set by the threshold setting unit 246. In addition, in a case where the operation mode is a user device mode or a combination mode to be described later, the determination unit 234 determines how to deal with the recognition result from the user device 40 on the basis of the comparison between the certainty factor of the recognition result and the threshold set by the threshold setting unit 246.

The operation mode control unit 238 controls an operation mode related to the speech recognition of the speech processing apparatus 22 between a plurality of operation modes including a local mode, a hybrid mode, a user device mode, and a combination mode. The user device mode is an operation mode in which the speech recognition is performed in the speech processing apparatus 20 and the user device 40 but is not performed in the server 30. The combination mode is an example of a third operation mode, and is an operation mode in which the speech recognition is performed by three devices of the speech processing apparatus 20, the user device 40, and the server 30. The operation mode control unit 238 can set the operation mode depending on the situation of connection between the server 30 and the communication unit 240 and the situation of connection between the user device 40 and the communication unit 240. In addition, the operation mode control unit 238 can control the operation mode in accordance with the user's operation.

The threshold setting unit 246 dynamically sets a threshold used when the determination unit 232 determines how to deal with the local recognition result. In one example, the threshold setting unit 244 sets a threshold depending on whether the operation mode is the local mode, the hybrid mode, the user device mode, or the combination mode. A specific example of the threshold to be set by the threshold setting unit 246 is now described with reference to FIG. 10.

Figure 10:
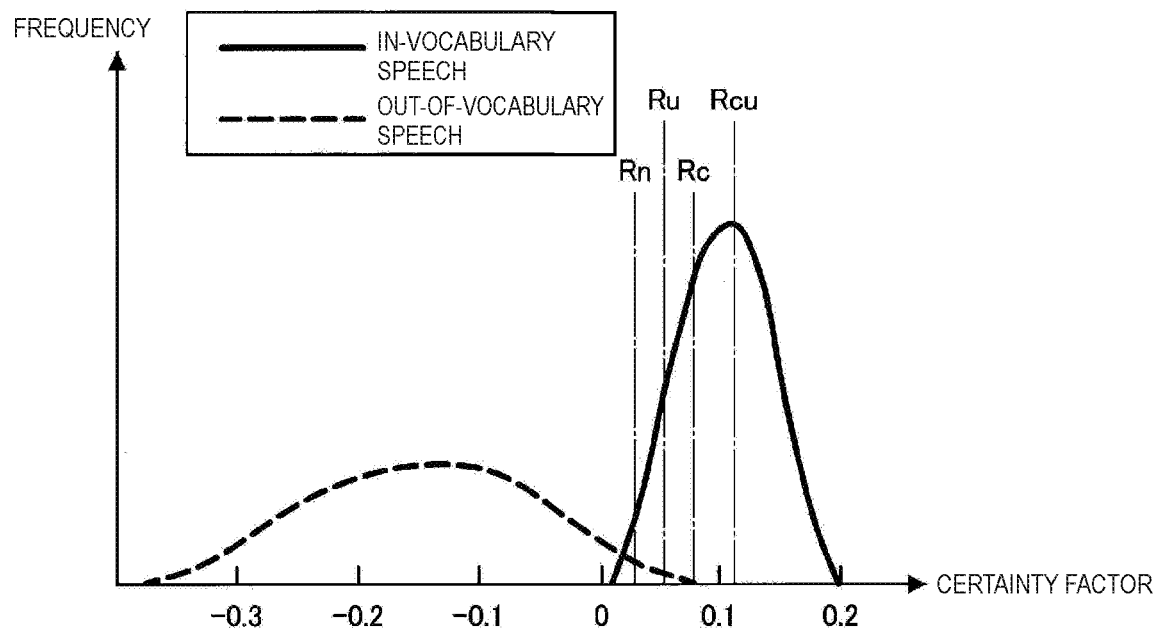
FIG. 10 is a diagram illustrated to describe a specific example of a threshold that is set by a threshold setting unit.

FIG. 10 is a diagram illustrated to describe a specific example of the threshold that is set by the threshold setting unit 246. The threshold setting unit 246 sets the threshold of the user device mode to a value higher than the threshold of the local mode. In one example, as illustrated in FIG. 10, a threshold Ru in the user device mode is set to a value higher than a threshold Rn in the local mode.

According to such a configuration, in the user device mode, the local recognition result is more likely to be rejected than in the local mode, so it is possible to achieve effective utilization of the recognition result from the user device 40. In addition, the threshold Ru in the user device mode is set to a value lower than a threshold Rc in the hybrid mode as illustrated in FIG. 10. The vocabulary of the dictionary data that is referred to by the speech recognizer 424 of the user device 40 is smaller than that of the dictionary data referred to by the speech recognizer 324 of the server 30, so the confidence level of the recognition result from the user device 40 is not as high as the confidence level of the server recognition result. Thus, as described above, the threshold Ru in the user device mode is set to a value lower than the threshold Rc in the hybrid mode so that the recognition result from the user device 40 is not actively used excessively.

On the other hand, the threshold setting unit 246 sets the threshold in the combination mode to a value higher than the threshold in the hybrid mode. In one example, as illustrated in FIG. 10, the threshold Rcu in the combination mode is set to a value higher than the threshold Rc in the hybrid mode. According to such a configuration, the local recognition result is more likely to be rejected, so the server recognition result or the recognition result from the user device 40 is easily used. Here, the user device 40 and the server 30 that perform the speech recognition in the combination mode can perform the speech recognition with higher accuracy than the speech processing apparatus 22. Thus, the setting of the threshold in the combination mode to a value higher than the threshold in the hybrid mode as described above makes it possible for the determination unit 234 to determine to use more appropriately of the recognition result.

Figure 11:
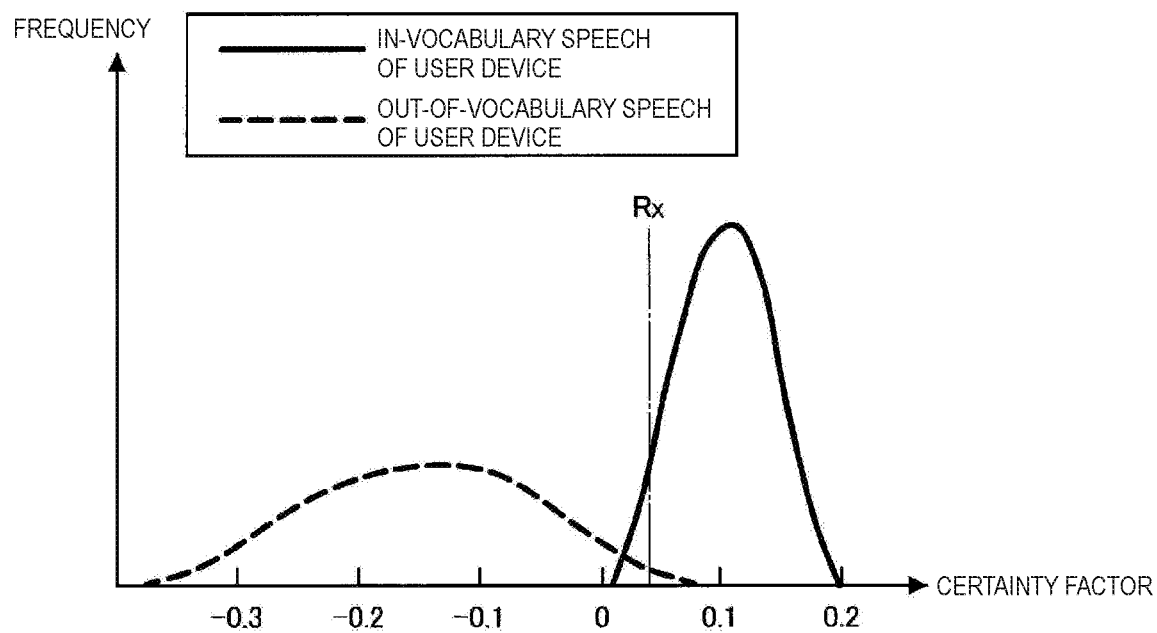
FIG. 11 is a diagram illustrated to describe a specific example of a threshold that is set by a threshold setting unit.

Moreover, the threshold setting unit 246 also sets a threshold Rx used when the determination unit 232 determines the recognition result from the user device 40. In one example, the threshold Rx may be a value within a range in which certainty factors overlap between the out-of-vocabulary speech and the in-vocabulary speech of the user device 40 as illustrated in FIG. 11.

<2-2. Operation>

The configuration of the speech processing system according to the second embodiment is described above. Subsequently, the operation of the second embodiment is described sequentially with reference to FIG. 12.

Figure 12:
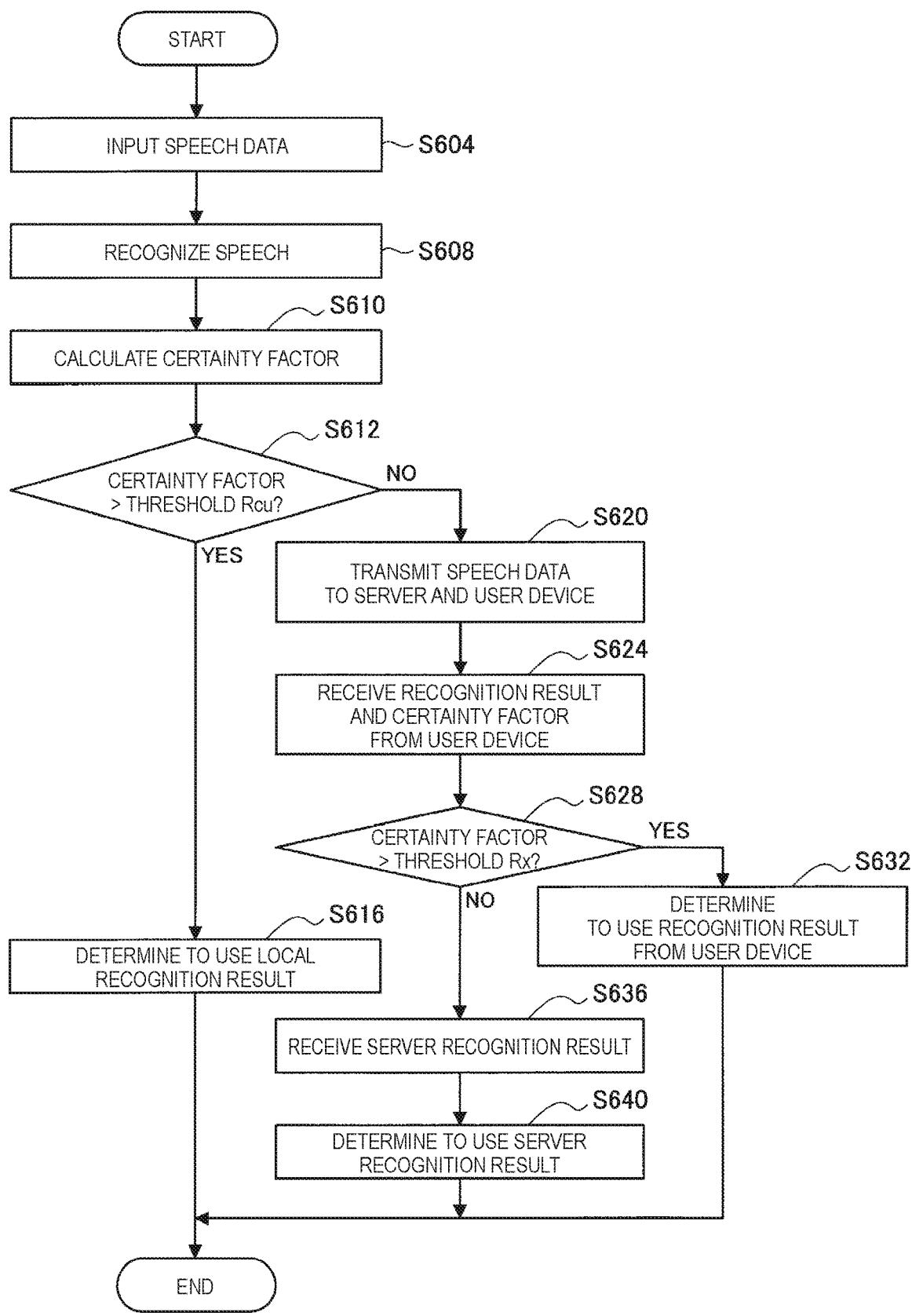
FIG. 12 is a flowchart illustrating the operation of the second embodiment.

FIG. 12 is a flowchart illustrating the operation of the second embodiment. Specifically, FIG. 12 illustrates the operation of the speech processing apparatus 22 in the combination mode.

First, as illustrated in FIG. 12, if the speech data is input from the sound pickup unit 220 to the speech recognizer 224 (S604), the speech recognizer 224 recognizes the speech data (S608). Then, the certainty factor calculation unit 228 calculates a certainty factor of the local recognition result (S610).

Here, if the certainty factor of the local recognition result exceeds the threshold Rcu (Yes in S612), the determination unit 234 determines to use the local recognition result (S616).

On the other hand, if the certainty factor of the local recognition result is equal to or less than the threshold Rcu (No in S612), the communication unit 240 transmits the speech data to the server 30 and the user device 40 (S620). Then, if the communication unit 240 receives the recognition result and the certainty factor from the user device 40 (S624), the determination unit 234 compares the received certainty factor with the threshold Rx (S628).

Then, if the received certainty factor exceeds the threshold Rx (Yes in S628), the determination unit 234 determines to use the recognition result from the user device 40 (S632). On the other hand, if the received certainty factor is equal to or less than the threshold Rx (No in S628), the communication unit 240 receives the server recognition result (S636), then the determination unit 234 determines to use the server recognition result (S640).

Moreover, although the above description is given of the example in which the communication unit 240 transmits the speech data to the server 30 and the user device 40 in the case where it is determined that the certainty factor of the local recognition result is equal to or less than the threshold Rcu in S612, the communication unit 240 can transmit the speech data to the server 30 and the user device 40 during S604 to S612. Such a configuration makes it possible to improve the responsiveness of the speech processing system.

Alternatively, the transmission of the speech data to the server 30 may be performed in the case where it is determined that the certainty factor received from the user device 40 in S628 is equal to or less than the threshold Rx. Such a configuration makes it possible to eliminate or reduce the traffic of communication with the server 30, thereby reducing the power consumption.

<<3. Hardware Configuration>>

The embodiments of the present disclosure are described above. The information processing such as speech recognition and calculation of certainty factor as described above is achieved by cooperation of software and hardware of the speech processing apparatus 20 described below.

Figure 13:
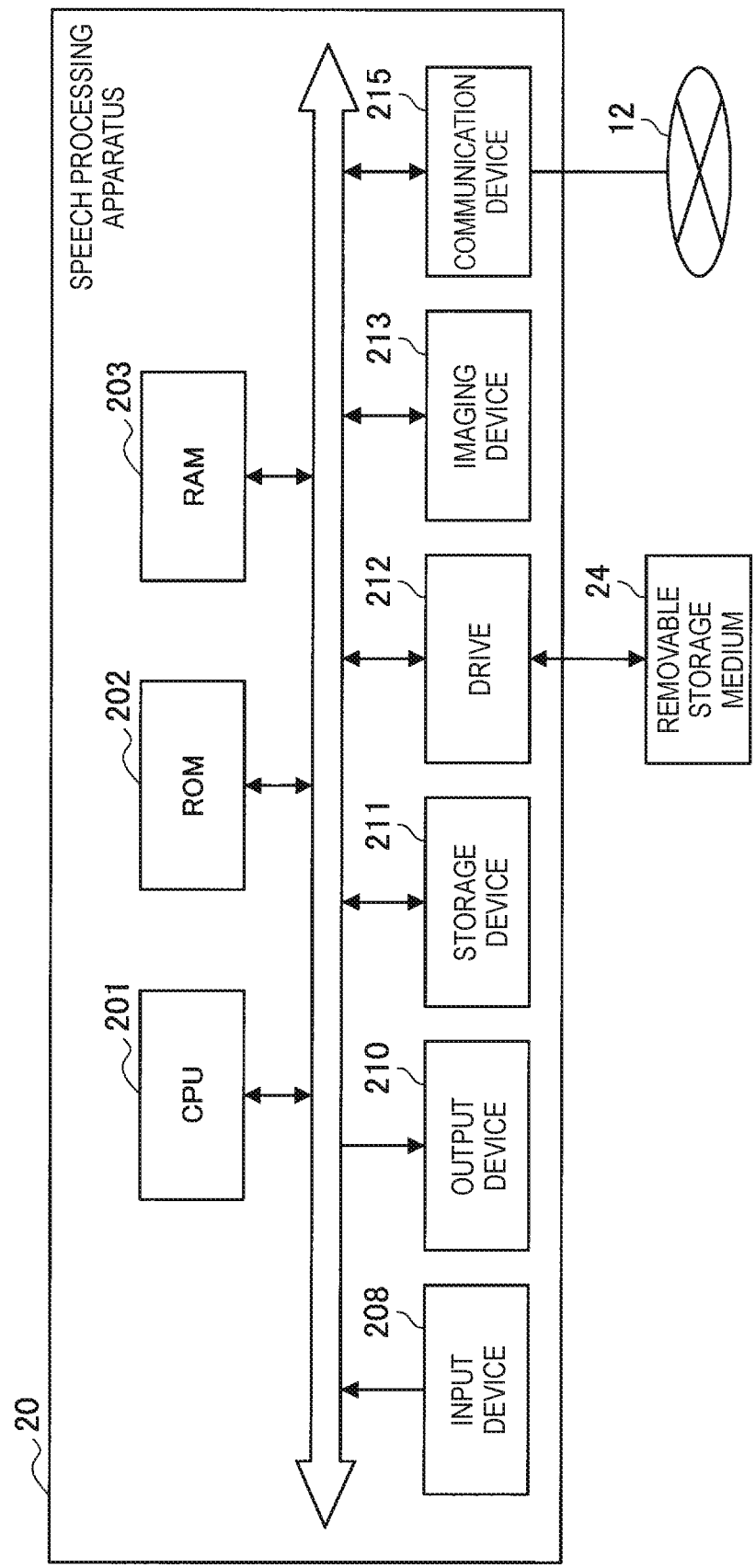
FIG. 13 is a diagram illustrated to describe a hardware configuration of the speech processing apparatus.

FIG. 13 is a diagram illustrated to describe the hardware configuration of the speech processing apparatus 20. As illustrated in FIG. 13, the speech processing apparatus 20 includes a central processing unit (CPU) 201, a read only memory (ROM) 202, a random access memory (RAM) 203, an input device 208, an output device 210, a storage device 211, a drive 212, an imaging device 213, and a communication device 215.

The CPU 201 functions as an operation processing device and a control device, and controls all the operations within the speech processing apparatus 20 in accordance with various programs. In addition, the CPU 201 may be a microprocessor. The ROM 202 stores programs and operation parameters used by the CPU 201. The RAM 203 temporarily stores programs used in the execution of the CPU 201 or stores parameters or the like that are appropriately changed in the execution thereof. These components are mutually connected through a host bus including a CPU bus or the like. The cooperation of the CPU 201, the ROM 202, and the RAM 203 with software makes it possible to implement the functions of the speech recognizer 224, the certainty factor calculation unit 228, and the threshold setting unit 244 (or 246).

The input device 208 includes an input means, an input control circuit, or the like. The input means is used for a user to input information, such as a mouse, a keyboard, a touch panel, a button, a microphone, a switch, or a lever. The input control circuit generates an input signal on the basis of an input by the user and outputs it to the CPU 201. The user of the speech processing apparatus 20 is capable of operating the input device 208 to input various data to the speech processing apparatus 20 or to instruct it to perform processing operations.

The output device 210 includes, in one example, a display device, such as a liquid crystal display (LCD) device, an organic light emitting diode (OLED) device, or a lamp. Furthermore, the output device 210 includes a sound output device, such as a speaker or a headphone. In one example, the display device displays a captured image or a generated image. On the other hand, the sound output device converts speech data or the like into sound and outputs it.

The storage device 211 is a device for data storage constituted as an example of a storage unit of the speech processing apparatus 20 according to the present embodiment. The storage device 211 may include a storage medium, a recording device that records data to the storage medium, a reading device that reads data from the storage medium, and an erasure device that erases data recorded in the storage medium. This storage device 211 stores programs executed by the CPU 201 and various data.

The drive 212 is a reader-writer for the storage medium, and is built into the speech processing apparatus 20 or is externally attached thereto. The drive 212 reads information recorded on a removable storage medium 24, such as a mounted magnetic disk, optical disk, magneto-optical disk, or semiconductor memory, and outputs it to the RAM 203. In addition, the drive 212 can write information to the removable storage medium 24.

The imaging device 213 includes an imaging optical system such as a condenser for collecting light and a zoom lens, and a signal conversion device such as a charge coupled device (CCD) and a complementary metal oxide semiconductor (CMOS). The imaging optical system condenses light emitted from a subject to form a subject image on a signal converting portion, and the signal conversion device converts the formed subject image into an electrical image signal.

The communication device 215 is, in one example, a communication interface constituted by a communication device or the like for connecting to the communication network 12. In addition, the communication device 215 may be a wireless local area network (LAN) compatible communication device, a long-term evolution (LTE) compatible communication device, or a wired communication device that performs wired communication.

<<4. Concluding Remarks>>

According to the embodiments of the present disclosure as described above, it is possible to set dynamically the threshold used in determining how to deal with the speech recognition result. Thus, according to the embodiments of the present disclosure, it is possible to perform flexibly the speech recognition-related processing suitable for the surrounding environment of the user or the availability of an external device.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In one example, although the above description is given of the example in which the speech processing apparatus 22 performs the speech recognition, the speech processing apparatus 22 may not necessarily perform the speech recognition. In this case, the speech processing apparatus 22 can operate in either the operation mode in which the user device 40 performs the speech recognition, the operation mode in which the user device 40 and the server 30 perform the speech recognition, or the operation mode in which the server 30 performs the speech recognition. The speech processing apparatus 22 is capable of performing the processing suitable for each operation mode by setting the threshold as described above depending on which operation mode is set.

Further, it may not be necessary to chronologically execute respective steps in the processing of the speech processing apparatus 20 in this specification, in the order described in the flowcharts. In one example, the respective steps in the processing of the speech processing apparatus 20 may be processed in the order different from the order described in the flowcharts, or may also be processed in parallel.

Furthermore, it is possible to create a computer program for causing hardware components, such as the CPU 201, the ROM 202, and the RAM 203 incorporated in the speech processing apparatus 20 to implement the functions equivalent to the respective components of the speech processing apparatus 20 described above. In addition, a storage medium on which the computer program is stored is also provided.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A speech processing apparatus including:

a determination unit configured to determine how to deal with a recognition result of speech data obtained by a first speech recognizer on a basis of a comparison between a certainty factor of the recognition result of the speech data obtained by the first speech recognizer and a threshold; and a threshold setting unit configured to set dynamically the threshold.

(2)

The speech processing apparatus according to (1), in which the threshold setting unit sets the threshold depending on a relevant operation mode among a plurality of operation modes including a first operation mode in which the speech data is recognized by the first speech recognizer and a second operation mode in which the speech data is recognized by the first speech recognizer and a second speech recognizer.

(3)

The speech processing apparatus according to (2), including:

the first speech recognizer;

a certainty factor calculation unit configured to calculate the certainty factor of the recognition result obtained by the first speech recognizer; and a communication unit configured to transmit the speech data to an external device having the second speech recognizer and to receive information based on speech recognition from the external device in the second operation mode.

(4)

The speech processing apparatus according to (2) or (3), in which the threshold setting unit sets, as the threshold, a higher value in a case where the operation mode is the second operation mode than a case where the operation mode is the first operation mode.

(5)

The speech processing apparatus according to (2) or (3), in which the threshold setting unit sets, as the threshold, one of values included in a plurality of values prepared in advance in a case where the operation mode is the second operation mode.

(6)

The speech processing apparatus according to (5), in which the plurality of values include values higher and lower than a value set as the threshold in the first operation mode.

(7)
The speech processing apparatus according to (3),
in which the communication unit transmits the speech data to the external device before the determination unit determines how to deal with the speech recognition result obtained by the first speech recognizer in the second operation mode.

(8)
The speech processing apparatus according to (3),
in which the determination unit determines to use the information based on the speech recognition obtained by the second speech recognizer on a basis that the certainty factor of the recognition result of the speech data obtained by the first speech recognizer is equal to or less than the threshold in the second operation mode.

(9)
The speech processing apparatus according to (2),
in which the determination unit outputs a signal indicating a failure in recognition of the speech data in a case where the certainty factor of the recognition result of the speech data obtained by the first speech recognizer is equal to or less than the threshold in the first operation mode.

(10)
The speech processing apparatus according to (3),
in which the threshold setting unit sets the threshold depending on a situation of communication between the external device and the communication unit in the second operation mode.

(11)
The speech processing apparatus according to (1),
in which the threshold setting unit sets the threshold depending on a noise component included in the speech data.

(12)
The speech processing apparatus according to (2),
in which the plurality of operation modes include a third operation mode in which the speech data is recognized by the first speech recognizer, the second speech recognizer, and a third speech recognizer, and
the threshold setting unit sets, as the threshold, in a case where the operation mode is the third operation mode, a value being higher than a case where the operation mode is the first operation mode and lower than a case where the operation mode is the second operation mode.

(13)
The speech processing apparatus according to (2),
in which the determination unit determines how to deal with a recognition result of speech data obtained by a third speech recognizer on a basis of a comparison between a certainty factor of the recognition result of the speech data obtained by the third speech recognizer and a threshold, and
the threshold setting unit sets the threshold used for a comparison with the certainty factor of the recognition result obtained by the third speech recognizer to a value different from the threshold used for a comparison with the recognition result obtained by the first speech recognizer.

(14)
The speech processing apparatus according to (12) or (13),
in which the third speech recognizer performs speech recognition using dictionary data having vocabulary data more than vocabulary data of the first speech recognizer, and
the second speech recognizer performs speech recognition using dictionary data having vocabulary data more than vocabulary data of the third speech recognizer.

(15)
A speech processing method including:
determining how to deal with a recognition result of speech data on a basis of a comparison between a certainty factor of the recognition result of the speech data and a threshold; and
setting dynamically the threshold.

REFERENCE SIGNS LIST 20, 22 speech processing apparatus
30 server
40 user device
220 sound pickup unit
224 speech recognizer
228 certainty factor calculation unit
232, 234 determination unit
236, 238 operation mode control unit
240 communication unit
244, 246 threshold setting unit
324 speech recognizer
340 communication unit
424 speech recognizer
428 certainty factor calculation unit
440 communication unit

The invention claimed is:
1. A speech processing apparatus comprising:
a determination unit configured to determine how to deal with a recognition result of speech data obtained by a first speech recognizer on a basis of a comparison between a certainty factor of the recognition result of the speech data obtained by the first speech recognizer and a threshold; and
a threshold setting unit configured to set dynamically the threshold,
wherein the threshold setting unit sets the threshold depending on a relevant operation mode among a plurality of operation modes including a first operation mode in which the speech data is recognized by the first speech recognizer and a second operation mode in which the speech data is recognized by the first speech recognizer and a second speech recognizer,
wherein the plurality of operation modes further includes a third operation mode in which the speech data is recognized by the first speech recognizer, the second speech recognizer, and a third speech recognizer, and
wherein the threshold setting unit sets, as the threshold, in a case where the operation mode is the third operation mode, a value being higher than a case where the operation mode is the first operation mode and lower than a case where the operation mode is the second operation mode.

2. The speech processing apparatus according to claim 1, comprising:
the first speech recognizer;
a certainty factor calculation unit configured to calculate the certainty factor of the recognition result obtained by the first speech recognizer; and
a communication unit configured to transmit the speech data to an external device having the second speech recognizer and to receive information based on speech recognition from the external device in the second operation mode.

3. The speech processing apparatus according to claim 2, wherein the communication unit transmits the speech data to the external device before the determination unit determines how to deal with the speech recognition result obtained by the first speech recognizer in the second operation mode.

4. The speech processing apparatus according to claim 2, wherein the determination unit determines to use the information based on the speech recognition obtained by the second speech recognizer on a basis that the certainty factor of the recognition result of the speech data obtained by the first speech recognizer is equal to or less than the threshold in the second operation mode.

5. The speech processing apparatus according to claim 2, wherein the threshold setting unit sets the threshold depending on a situation of communication between the external device and the communication unit in the second operation mode.

6. The speech processing apparatus according to claim 1, wherein the threshold setting unit sets, as the threshold, one of values included in a plurality of values prepared in advance in a case where the operation mode is the second operation mode.

7. The speech processing apparatus according to claim 6, wherein the plurality of values include values higher and lower than a value set as the threshold in the first operation mode.

8. The speech processing apparatus according to claim 1, wherein the threshold setting unit sets, as the threshold, a higher value in a case where the operation mode is the second operation mode than a case where the operation mode is the first operation mode.

9. The speech processing apparatus according to claim 1, wherein the determination unit outputs a signal indicating a failure in recognition of the speech data in a case where the certainty factor of the recognition result of the speech data obtained by the first speech recognizer is equal to or less than the threshold in the first operation mode.

10. The speech processing apparatus according to claim 1, wherein the threshold setting unit sets the threshold depending on a noise component included in the speech data.

11. The speech processing apparatus according to claim 1, wherein the third speech recognizer performs speech recognition using dictionary data having vocabulary data more than vocabulary data of the first speech recognizer, and
the second speech recognizer performs speech recognition using dictionary data having vocabulary data more than vocabulary data of the third speech recognizer.

12. The speech processing apparatus according to claim 1, wherein the first speech recognizer is a local terminal, the second speech recognizer is a server, and the third speech recognizer is a user device.

13. A speech processing method comprising:
determining how to deal with a recognition result of speech data on a basis of a comparison between a certainty factor of the recognition result of the speech data and a threshold; and
setting, by a processor, dynamically the threshold depending on a relevant operation mode among a plurality of operation modes including a first operation mode in which the speech data is recognized by a first speech recognizer and a second operation mode in which the speech data is recognized by the first speech recognizer and a second speech recognizer,
wherein the plurality of operation modes further includes a third operation mode in which the speech data is recognized by the first speech recognizer, the second speech recognizer, and a third speech recognizer, and
wherein the threshold is set, in a case where the operation mode is the third operation mode, a value being higher than a case where the operation mode is the first operation mode and lower than a case where the operation mode is the second operation mode.

14. The speech processing method according to claim 13, wherein the first speech recognizer is a local terminal, the second speech recognizer is a server, and the third speech recognizer is a user device.

* * * * *